US010689225B2

(12) United States Patent
Barajas Gonzalez et al.

(10) Patent No.: US 10,689,225 B2
(45) Date of Patent: Jun. 23, 2020

(54) PREDICTIVE ANALYTICS TO DETERMINE ELEVATOR PATH AND STAGING

(71) Applicant: International Business Machines Corporation, Armonk, NY (US)

(72) Inventors: Emmanuel Barajas Gonzalez, Guadalajara (MX); Shaun E. Harrington, Sahuarita, AZ (US); Harry R. McGregor, Tucson, AZ (US); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 15/905,878

(22) Filed: Feb. 27, 2018

(65) Prior Publication Data

US 2018/0290859 A1    Oct. 11, 2018

Related U.S. Application Data

(63) Continuation of application No. 15/482,883, filed on Apr. 10, 2017, now Pat. No. 10,358,318.

(51) Int. Cl.
*B66B 1/34* (2006.01)
*B66B 1/24* (2006.01)
(Continued)

(52) U.S. Cl.
CPC .............. *B66B 1/2408* (2013.01); *B66B 1/28* (2013.01); *B66B 1/3476* (2013.01); *G06N 5/04* (2013.01);
(Continued)

(58) Field of Classification Search
CPC ....... B66B 1/2408; B66B 1/2416; B66B 1/28; B66B 1/3476; B66B 2201/402;
(Continued)

(56) References Cited

U.S. PATENT DOCUMENTS

| 5,183,981 | A | 2/1993 | Thangavelu |
| 5,672,853 | A | 9/1997 | Whitehall et al. |

(Continued)

FOREIGN PATENT DOCUMENTS

| DE | 102006046062 A1 | 4/2008 |
| WO | 2015094178 A1 | 6/2015 |

(Continued)

OTHER PUBLICATIONS

Chen et al., "GA Based Hybrid Fuzzy Rule Optimization Approach for Elevator Group Control System", Transactions of the Canadian Society for Mechanical Engineering, vol. 37, No. 3, 2013, Canada, pp. 937-947.

(Continued)

*Primary Examiner* — Anthony J Salata
(74) *Attorney, Agent, or Firm* — Edward J. Wixted, III

(57) ABSTRACT

In an approach for determining an optimal path for an elevator, a processor receives information, wherein the information includes social media data associated with a user and calendar entries associated with the user, indicating one or more locations within a building. A processor analyzes the received information. A processor determines a location to send an elevator within the building to minimize movement of the elevator, based on the analyzed information. A processor causes the elevator to move to the location.

1 Claim, 3 Drawing Sheets

(51) Int. Cl.
*B66B 1/28* (2006.01)
*G06N 5/04* (2006.01)

(52) U.S. Cl.
CPC ... *B66B 2201/235* (2013.01); *B66B 2201/243* (2013.01); *B66B 2201/402* (2013.01); *B66B 2201/4676* (2013.01)

(58) Field of Classification Search
CPC ...... B66B 2201/243; B66B 2201/4676; B66B 2201/235; B66B 2201/21; B66B 2201/212; G06N 5/04; G05B 15/00
USPC ....... 187/247, 248, 277, 380–389, 391, 392, 187/393, 396; 706/12, 15, 21, 23, 910, 706/918
See application file for complete search history.

(56) References Cited

U.S. PATENT DOCUMENTS

| | | | |
|---|---|---|---|
| 5,714,725 A | 2/1998 | Thangavelu | |
| 5,750,946 A | 5/1998 | Thangavelu | |
| 5,767,460 A | 6/1998 | Thangavelu | |
| 5,786,550 A | 7/1998 | Thangavelu | |
| 6,672,431 B2* | 1/2004 | Brand | B66B 1/2458 187/247 |
| 7,562,746 B2* | 7/2009 | Yoshikawa | B66B 1/2458 187/247 |
| 7,730,999 B2* | 6/2010 | Yoshikawa | B66B 1/2458 187/247 |
| 8,260,042 B2 | 9/2012 | Peng et al. | |
| 8,499,895 B2* | 8/2013 | Zweig | B66B 1/468 187/247 |
| 8,820,486 B2 | 9/2014 | Gerstenkorn et al. | |
| 9,126,806 B2 | 9/2015 | Joyce | |
| 9,284,158 B2* | 3/2016 | Sarjanen | B66B 1/468 |
| 9,323,232 B2 | 4/2016 | Blom et al. | |
| 9,505,586 B2 | 11/2016 | Wu | |
| 9,988,238 B2* | 6/2018 | Simcik | B66B 1/468 |
| 10,017,355 B2* | 7/2018 | Silvennoinen | B66B 1/2408 |
| 10,035,679 B2* | 7/2018 | Armistead | B66B 1/46 |
| 10,118,797 B2* | 11/2018 | Keser | B66B 1/468 |
| 10,189,677 B2* | 1/2019 | Bryant | G06K 9/00288 |
| 10,249,069 B1* | 4/2019 | Kerzner | G06K 9/00771 |
| 10,336,573 B2* | 7/2019 | Hovi | B66B 1/2408 |
| 10,513,417 B2* | 12/2019 | Zhao | B66B 1/468 |
| 2015/0075914 A1 | 3/2015 | Armistead et al. | |
| 2016/0031675 A1 | 2/2016 | Henry et al. | |
| 2016/0304312 A1 | 10/2016 | Thompson | |
| 2016/0325962 A1 | 11/2016 | Blandin et al. | |
| 2017/0313546 A1 | 11/2017 | King | |
| 2017/0369275 A1 | 12/2017 | Ruchir et al. | |
| 2018/0148296 A1 | 6/2018 | Arguedas et al. | |
| 2018/0099840 A1 | 10/2018 | Armistead | |

FOREIGN PATENT DOCUMENTS

| | | |
|---|---|---|
| WO | 2016073067 A1 | 5/2016 |
| WO | 2017081507 A1 | 5/2017 |

OTHER PUBLICATIONS

Hiller et al., "Reoptimization in Branch-and-Bound Algorithms with an Application to Elevator Control", Experimental Algorithms, vol. 7933 of the series Lecture Notes in Computer Science, 2013, Springer Berlin Heidelberg, pp. 378-389.

Wang et al.,"Elevator group dispatch algorithm based on artificial fish-swarm algorithm", Journal of Mechanical & Electrical Engineering, China Academic Journal Electronic Publishing House, vol. 30 No. 7, Jul. 2013, DOI:10.3969/j.issn. 1001-4551.2013.07.027, <http:// www.cnki.net>. pp. 888-892.

Wei et al., "Elevator Group Control with Destination Scheduling", 2013 Ninth International Conference on Natural Computation (ICNC), 2013, IEEE, pp. 1650-1654.

Barajas Gonzalez et al., "Predictive Analytics to Determine Elevator Path and Staging", U.S. Appl. No. 15/482,883, filed Apr. 10, 2017, 25 pages.

IBM, List of Patent Applications Treated As Related, Appendix P, Dated Feb. 27, 2018, 2 pages.

* cited by examiner

PREDICTIVE ANALYTICS TO DETERMINE ELEVATOR PATH AND STAGING

BACKGROUND

The present invention relates generally to the field of efficient movement, and more particularly to determining an optimal path for an elevator.

An elevator is a type of transportation that moves people or goods between floors, or levels, of a building or other structure. Elevators are generally powered by electrical motors that either drive traction cables or counterweight systems like a hoist or pump hydraulic fluid to raise a cylindrical piston (e.g., a jack). Because of wheelchair access laws, elevators are usually a requirement in new multistory buildings, especially where wheelchair ramps would be impractical.

SUMMARY

Aspects of an embodiment of the present invention disclose a method, computer program product, and computing system for determining an optimal path for an elevator. A processor receives information, wherein the information includes social media data associated with a user and calendar entries associated with the user, indicating one or more locations within a building. A processor analyzes the received information. A processor determines a location to send an elevator within the building to minimize movement of the elevator, based on the analyzed information. A processor causes the elevator to move to the location.

DETAILED DESCRIPTION

Embodiments of the present invention recognize that, in modern large-scale structures, efficient use of elevators is critical to the movement of people within the structure. This has to do with both "busy" parts of the day where many people are attempting to change location, as well as issues with the use of space and the cost of installation of additional elevators. Many large-scale structures have moved to a system of using both express elevators and local elevators to reduce the number of floors at which each elevator needs to stop.

Additionally, there have been many attempts at automating the selection of an elevator car based on a particular floor of choice in an attempt to enhance the efficiency of the elevator car, as opposed to sending the closest elevator car when called without any idea of the floor the end user wishes to travel.

While the aforementioned improvements have enhanced the efficiency of the elevator to a certain degree, embodiments of the present invention recognize the improvements are not capable to truly extract the efficiencies that are capable with using modern analytics, machine learning, facial recognition, and sensor networks. Increasing the efficiency of elevators reduces the amount of space within a building that must be dedicated to elevators, as well as increasing user satisfaction with reduced wait times and quicker movement within the structure.

Embodiments of the present invention describe an approach for utilizing key information gathered about personnel (e.g., building staff) within a building to help allocate elevator resources. By gathering data via the infrastructure already present within a building (e.g., cameras, facial recognition, badge reads, employee calendar information, etc.), embodiments of the present invention allow building administrators, and businesses in general, to determine the optimal location and route for an elevator at any given time. In doing so, embodiments of the present invention may alert key personnel as to where the elevator should be. Additionally, embodiments of the present invention may automate the location of the elevator within the building. The determinations allow personnel within a business to approach an elevator and, in most cases, have the elevator awaiting, assuming the elevator is not already in use. In the event of multiple pickups across multiple locations, embodiments of the present invention allow for multipoint pickup based upon the high levels of efficiency. The added level of efficiency allows for not only faster response times for personnel pickup, but a significant reduction in the requisite power needed/used. Embodiments of the present invention determine an optimal path for one or more elevators.

Embodiments of the present invention will now be described in detail with reference to the Figures.

Figure 1:
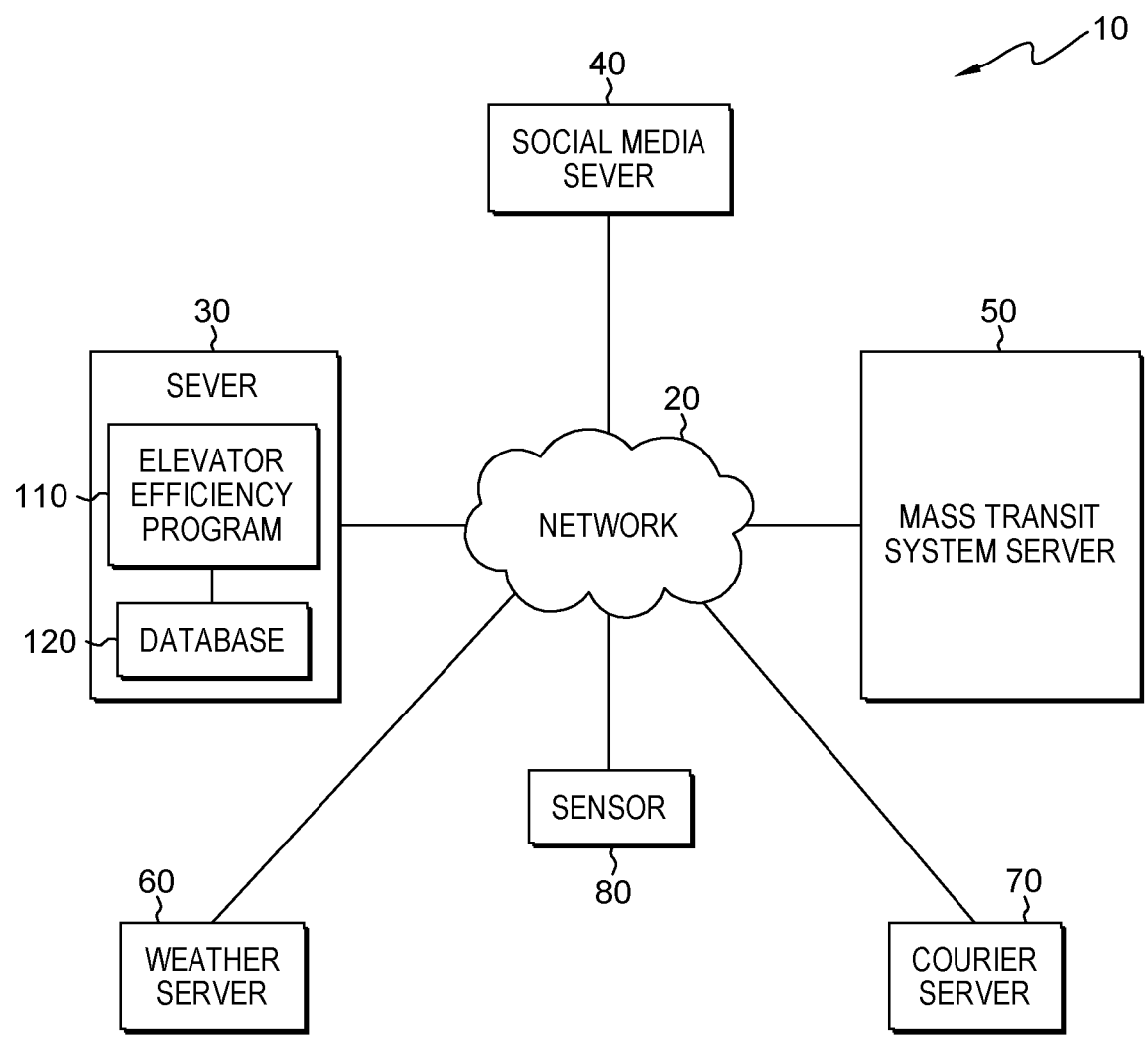
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30, social media server 40, mass transit system server 50, weather server 60, courier server 70, and sensor 80 interconnected over network 20. Network 20 may be a local area network (LAN), a wide area network (WAN) such as the Internet, a cellular data network, any combination thereof, or any combination of connections and protocols that will support communications between server 30, social media server 40, mass transit system server 50, weather server 60, courier server 70, and sensor 80, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with social media server 40, mass transit system server 50, weather server 60, courier server 70, and sensor 80 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains elevator efficiency program 110 and database 120. In other embodiments, server 30 may include elevator efficiency program 110, database 120, and/or other components, as depicted and described in further detail with respect to FIG. 3.

Social media server 40 may be a management server, a web server, or any other electronic device or computing system capable of processing program instructions and receiving and sending data. In some embodiments, social media server 40 may be a laptop computer, tablet computer, netbook computer, personal computer (PC), a desktop computer, or any programmable electronic device capable of communicating with server 30, mass transit system server 50, weather server 60, courier server 70, and sensor 80 via network 20. In other embodiments, social media server 40 may represent a server computing system utilizing multiple computers as a server system, such as in a cloud computing environment. In another embodiment, social media server 40 represents a computing system utilizing clustered computers and components to act as a single pool of seamless resources. In one embodiment, social media server 40 contains information, such as, for example, expressions of interest from various social media websites. In other embodiments, social media server 40 hosts a social networking website. In some embodiments, social media server 40 is a social media platform. In other embodiments, social media server 40 may include multiple components, as depicted and described in further detail with respect to FIG. 3.

Mass transit system server 50 may be a management server, a web server, or any other electronic device or computing system capable of processing program instructions and receiving and sending data. In some embodiments, mass transit system server 50 may be a laptop computer, tablet computer, netbook computer, personal computer (PC), a desktop computer, or any programmable electronic device capable of communicating with server 30, social media server 40, weather server 60, courier server 70, and sensor 80 via network 20. In other embodiments, mass transit system server 50 may represent a server computing system utilizing multiple computers as a server system, such as in a cloud computing environment. In another embodiment, mass transit system server 50 represents a computing system utilizing clustered computers and components to act as a single pool of seamless resources. In one embodiment, mass transit system server 50 contains information, such as, for example, mass transit schedules (e.g., train, bus, airline, etc.) within a particular geographical region. In other embodiments, mass transit system server 50 may include multiple components, as depicted and described in further detail with respect to FIG. 3.

Weather server 60 may be a management server, a web server, or any other electronic device or computing system capable of processing program instructions and receiving and sending data. In some embodiments, weather server 60 may be a laptop computer, tablet computer, netbook computer, personal computer (PC), a desktop computer, or any programmable electronic device capable of communicating with server 30, social media server 40, mass transit system server 50, courier server 70, and sensor 80 via network 20. In other embodiments, weather server 60 may represent a server computing system utilizing multiple computers as a server system, such as in a cloud computing environment. In another embodiment, weather server 60 represents a computing system utilizing clustered computers and components to act as a single pool of seamless resources. In one embodiment, weather server 60 contains information, such as, for example, weather data within a particular geographical region. In other embodiments, weather server 60 may include multiple components, as depicted and described in further detail with respect to FIG. 3.

Courier server 70 may be a management server, a web server, or any other electronic device or computing system capable of processing program instructions and receiving and sending data. In some embodiments, courier server 70 may be a laptop computer, tablet computer, netbook computer, personal computer (PC), a desktop computer, or any programmable electronic device capable of communicating with server 30, social media server 40, mass transit system server 50, weather server 60, and sensor 80 via network 20. In other embodiments, courier server 70 may represent a server computing system utilizing multiple computers as a server system, such as in a cloud computing environment. In another embodiment, courier server 70 represents a computing system utilizing clustered computers and components to act as a single pool of seamless resources. In one embodiment, courier server 70 contains information, such as, for example, tracking for parcel delivery that includes delivery times and destinations. In other embodiments, courier server 70 may include multiple components, as depicted and described in further detail with respect to FIG. 3.

Sensor 80 may be any device capable of detecting events or changes in an environment and providing a corresponding output. In one embodiment, sensor 80 may provide a corresponding output of a change in position to elevator efficiency program 110. Examples of sensor 80 may be, but is not limited to: a weight sensor; optical sensor; facial recognition sensor; near field communication (NFC) device; radio-frequency identification (RFID) tag; Bluetooth® device; accelerometer; and/or gyroscope. In some embodiments, sensors, such as sensor 80, may be operably affixed to one or more devices, such as, for example, an elevator car, elevator cable, badge, badge reader, door, camera, etc. In other embodiments, sensor 80 may include multiple components, as depicted and described in further detail with respect to FIG. 3.

Elevator efficiency program 110 determines an optimal path for an elevator. In doing so, elevator efficiency program 110 receives information. Elevator efficiency program 110 analyzes the information. Elevator efficiency program 110 determines an optimal elevator path. Elevator efficiency program 110 causes the elevator to move. In the depicted embodiment, elevator efficiency program 110 resides on server 30. In other embodiments, elevator efficiency program 110 may reside on another server or another computing device, provided that elevator efficiency program 110 can access database 120, social media server 40, mass transit system server 50, weather server 60, courier server 70, and sensor 80.

Database 120 may be a repository that may be written to and/or read by elevator efficiency program 110. In some embodiments, elevator efficiency program 110 may receive a set of data that includes historical elevator usage of a particular building and store the historical elevator usage to database 120. In other embodiments, database 120 may store the historical elevator usage of all buildings of similar size within a particular geographical location. In the depicted embodiment, database 120 resides on server 30. In other embodiments, database 120 may reside on another server or another computing device, provided that database 120 is accessible to elevator efficiency program 110.

Figure 2:
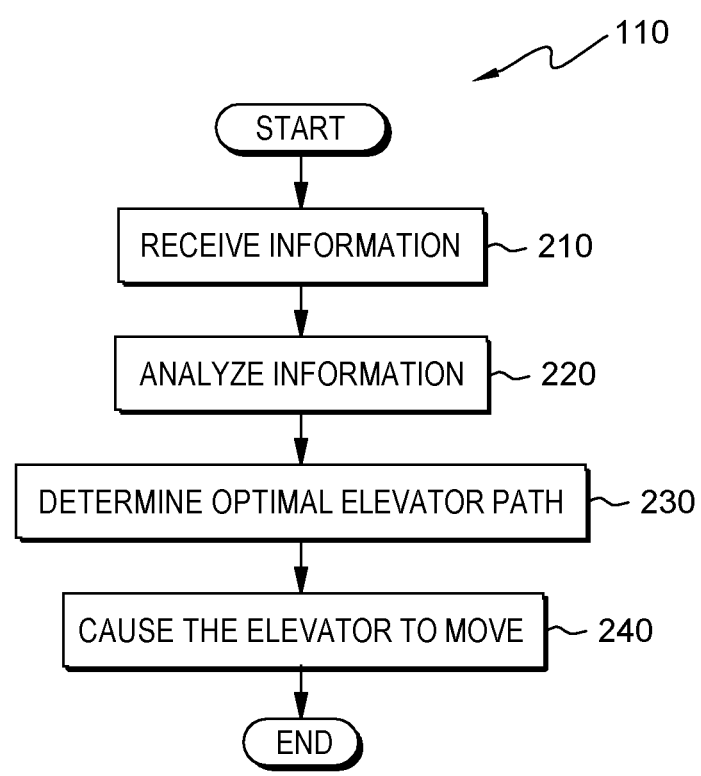
FIG. 2 depicts a flowchart of the steps of an elevator efficiency program, executing within the computing system of FIG. 1, for determining an optimal path for an elevator, in accordance with an embodiment of the present invention.

FIG. 2 depicts a flowchart of the steps of an elevator efficiency program, executing within the computing system of FIG. 1, in accordance with an embodiment of the present invention. Elevator efficiency program 110 determines an optimal path for an elevator.

Herein, an embodiment of the present invention focuses on an elevator that moves vertically. Other embodiments may include other types of transportation for people and goods that may serve a similar purpose as an elevator. Additionally, in some embodiments, an elevator may, at some point, move in other directions, besides vertically.

In step 210, elevator efficiency program 110 receives information. The information received allows elevator efficiency program 110 to run an elevator more efficiently. In one embodiment, elevator efficiency program 110 receives calendar entries from any system that a business may use to document calendar entries that involve a room allocation (e.g., a room reserved for a meeting) that include a date and time, while also taking into account the people who are not registered as traveling within the calendar system. Additional calendar entries may involve large numbers of people being away from a building at a particular time. Elevator efficiency program 110 may store the received calendar entries to database 120 for future use.

In some embodiments, elevator efficiency program 110 receives information that includes public and/or private social media entries from social media server 40 that indicate the movement of people within a building, or create an inference about possible movement of people within the building. For example, three people within a building tweet one another to meet on the dining floor. In reference to obtaining private information, elevator efficiency program 110 receives permissions (not shown) to access private information. For example, a person may have the option to opt-out or opt-in with regard to providing access to his or her personal and/or private information (e.g., private social media entries). Elevator efficiency program 110 may store the received calendar entries to database 120 for future use.

In other embodiments, elevator efficiency program 110 receives information from sensor 80, such as, building and floor occupancy data, measured by way of badge access credentials, facial recognition, and/or any other methods of counting individuals entering a building. Other information received from sensor 80 may include data from movement within a building and between floors as measured by way of badge access credentials, facial recognition, and/or any other methods of counting individuals moving throughout the building with an emphasis on the time of day and day of the week and floor movement patterns. Sensor 80 may include weight sensors within the elevator cars to determine available remaining weight capacity, as well as optical and facial recognition sensors to determine remaining volumetric and two-dimensional capacity within an elevator car. Elevator efficiency program 110 may store information received from sensor 80 to database 120 for future use.

In some embodiments, elevator efficiency program 110 receives courier tracking data from courier server 70 for parcel delivery, including expected/predicted delivery times and destinations within a building. Elevator efficiency program 110 may store the received tracking data to database 120 for future use.

In other embodiments, elevator efficiency program 110 receives geographically relevant weather data from weather server 60 to help predict the number of people within a building. For example, during extreme weather, i.e., very hot or very cold and rainy weather, there may be an expectation that people will stay in the building for longer periods of time once they enter. During a day where the weather conditions are pleasurable, there is an expectation that people are in and out of the building at a higher frequency. The people may be in and out of the building for lunch, meetings, gathering with friends, or a number of other reasons that people may gather outside. Additionally, on days with heavy snow, there is an expectation that people may not even be able to leave the house, and thus, there may be an expectation that there will be fewer people in the building. Elevator efficiency program 110 may store the received weather data to database 120 for future use.

In some embodiments, elevator efficiency program 110 receives mass transit system schedules within a geographical region from mass transit system server 50 to provide information on possible delays and arrival times of building occupants. Elevator efficiency program 110 may store the received mass transit data to database 120 for future use.

In other embodiments, elevator efficiency program 110 receives historical elevator usage data. The historical elevator usage may come from a number of places, including, but not limited to: any of the above-mentioned servers, reports created by a building administrator, and/or any other method that may be able to provide elevator efficiency program 110 with relevant data to assist in making the elevators within a building run more efficiently. Elevator efficiency program 110 may store the received historical usage data to database 120 for future use.

In step 220, elevator efficiency program 110 analyzes the information. In one embodiment, elevator efficiency program 110 applies analytics to take into account total expected elevator traffic for each accessible floor in a building throughout the day. In some embodiments, elevator efficiency program 110 applies analytics to the calendar and social media information to predict the movement of people and groups of people within a building. In other embodiments, elevator efficiency program 110 applies analytics to current occupancy data obtained from badge/closed-circuit television (CCTV) camera/facial recognition sources to determine occupancy ratio and predict elevator usage. In some embodiments, elevator efficiency program 110 applies analytics to predict elevator car utilization based on past trends of similar usage within a building. In other embodiments, elevator efficiency program 110 applies analytics to courier tracking information to determine time of courier arrival and internal building destination to predict elevator usage. Weather forecast information can be used to assist with predictive occupancy and time of an arrival to a building and used to model expected elevator usage.

In step 230, elevator efficiency program 110 determines an optimal elevator path. Throughout the day, in one embodiment, elevator efficiency program 110 determines where to stage elevator cars. In some embodiments, elevator efficiency program 110 determines optimal paths, on an as need basis, to increase the efficiency of personnel flow throughout a building. In other embodiments, as an added benefit, when elevator efficiency program 110 determines an optimal elevator path, the reduced elevator car movements will result in greater electrical energy savings.

In step 240, elevator efficiency program 110 causes the elevator to move. In one embodiment, elevator efficiency program 110 causes the elevator to move by sending instructions to the elevator based on the determined optimal elevator path or elevator location. In other embodiments, elevator efficiency program 110 sends the instructions to an administrator to allow the administrator to move the elevator as the administrator sees fit.

Figure 3:
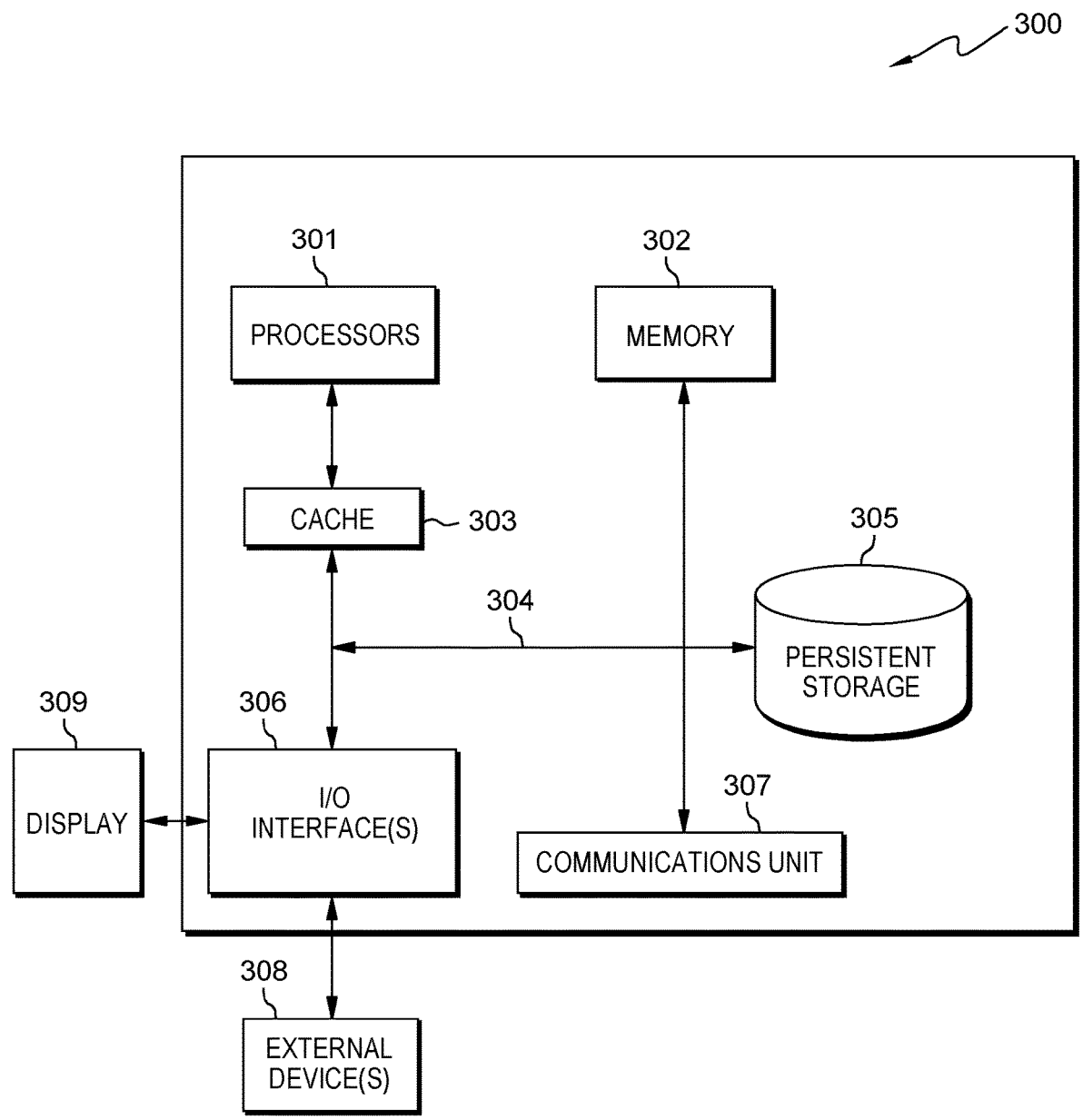
FIG. 3 depicts a block diagram of components of the servers of FIG. 1, in accordance with an embodiment of the present invention.

FIG. 3 depicts computer system 300, which is an example of a system that includes components of server 30, social media server 40, mass transit system server 50, weather server 60, courier server 70, and/or sensor 80. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Elevator efficiency program 110 and database 120 may be downloaded to persistent storage 305 of server 30 through communications unit 307 of server 30.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., elevator efficiency program 110 and database 120, can be stored on such portable computer readable storage media and can be loaded onto persistent storage 305 of server 30 via I/O interface(s) 306 of server 30. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining an optimal path for an elevator, the method comprising:
    receiving, by one or more processors, information, wherein the information includes badge access data, facial recognition sensor data, weight sensor data, historical elevator usage data, mass transit data, weather data, courier data, social media data associated with a user, and calendar entries associated with the user, indicating one or more locations within a building;
    analyzing, by one or more processors, the received information, wherein analyzing the received information comprises:
        predicting, by one or more processors, elevator utilization and elevator traffic for at least one floor throughout a day, based on historical usage trends associated with the received information;
        predicting, by one or more processors, movement of the user within the building, based on the calendar entries and the social media data;
        determining, by one or more processors, occupancy ratio and predicting elevator usage, based on data obtained from badge, closed circuit television, and facial recognition sources;
        determining, by one or more processors, a time of courier arrival and a destination within the building to predict elevator usage;
        predicting, by one or more processors, occupancy related to road closures and difficulties to make it to the building that arise due to inclement weather;
    determining, by one or more processors, a location to send an elevator within the building to minimize movement of the elevator, based on the analyzed information; and
    causing, by one or more processors, the elevator to move to the location.

* * * * *